Aug. 29, 1967  C. C. VAN LEER, JR., ETAL  3,338,485
AUTOMOBILE LUGGAGE AND ARTICLE CARRIER
Filed May 23, 1966  2 Sheets-Sheet 1
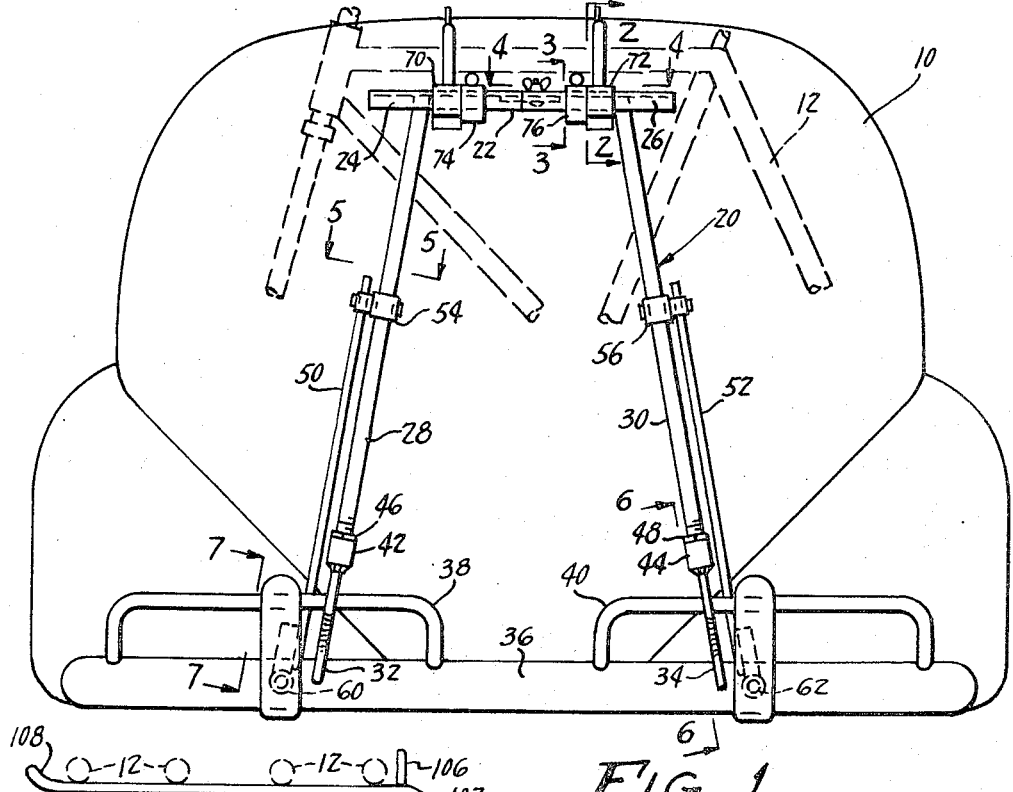
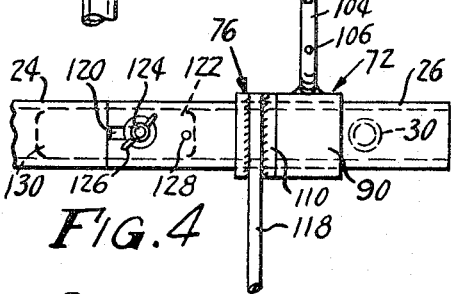
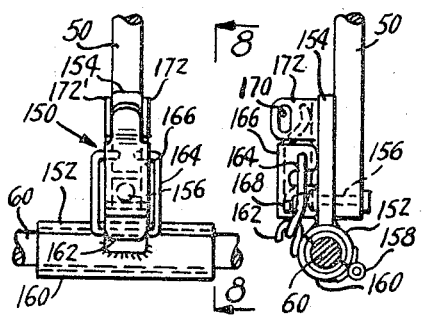
INVENTORS.
CARLOS C. VAN LEER, JR.
HAROLD F. CAMPBELL
BY *Kimmel, Crowell & Weaver*
ATTORNEYS.

Aug. 29, 1967 C. C. VAN LEER, JR., ETAL 3,338,485
AUTOMOBILE LUGGAGE AND ARTICLE CARRIER
Filed May 23, 1966 2 Sheets-Sheet 2
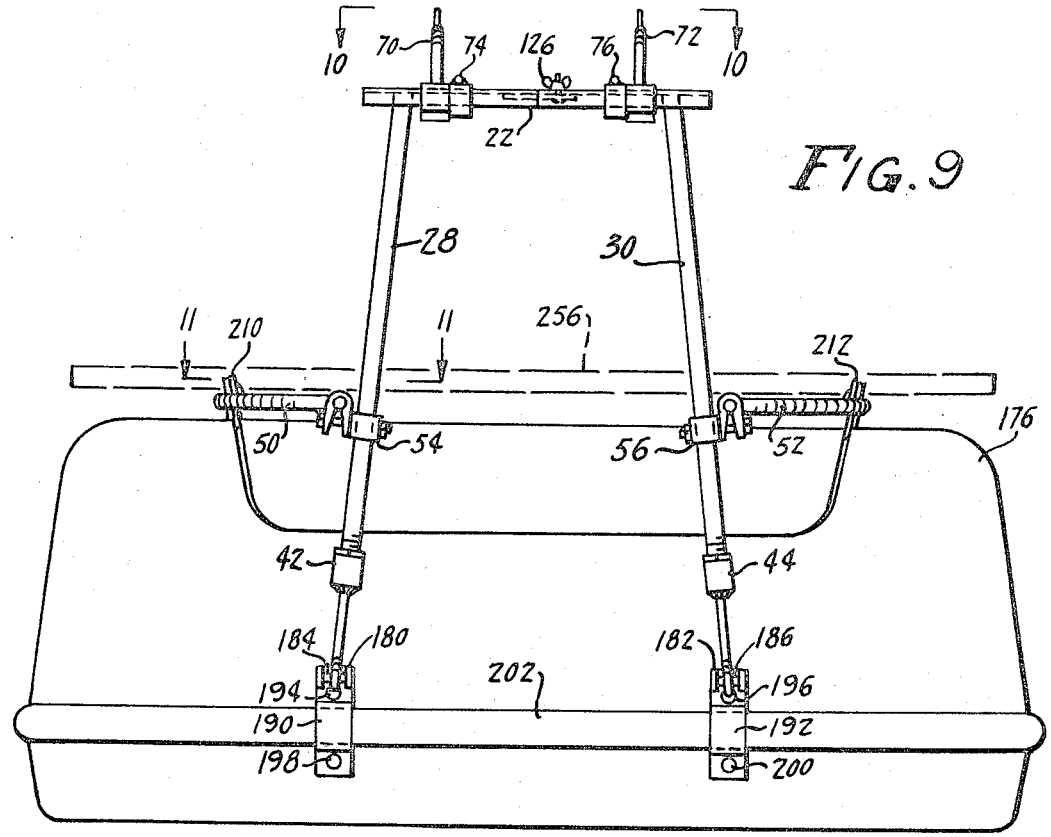
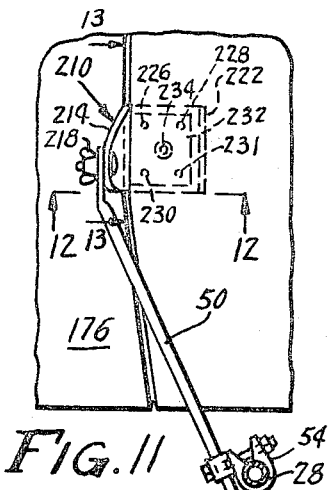
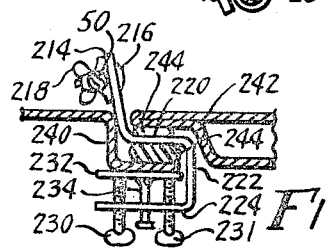
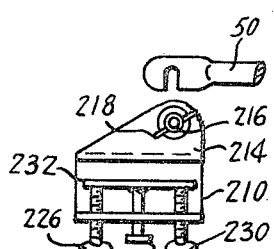
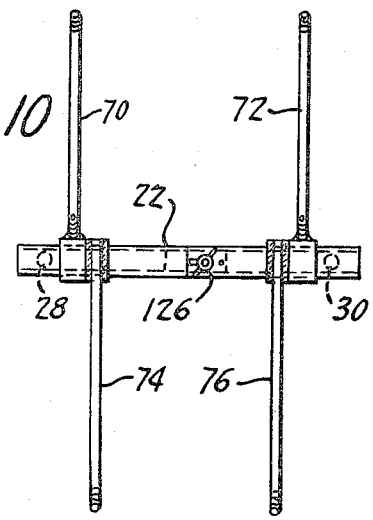
INVENTORS.
CARLOS C. VAN LEER, JR.
HAROLD F. CAMPBELL
BY Kimmel, Crowell & Weaver
ATTORNEYS.

United States Patent Office 3,338,485
Patented Aug. 29, 1967

3,338,485
AUTOMOBILE LUGGAGE AND ARTICLE
CARRIER
Carlos C. Van Leer, Jr., 4712 Dover Road, Washington,
D.C. 20016, and Harold F. Campbell, 5515 Southwick St., Bethesda, Md. 20034
Filed May 23, 1966, Ser. No. 552,085
11 Claims. (Cl. 224—42.03)

ABSTRACT OF THE DISCLOSURE

A lightweight four point supported luggage and bicycle carrier for automobiles having a rigid crossbar running parallel to the car bumper and supported above the car by a pair of upright rods which engage the car bumper at their lower ends and a pair of braces secured to the car at spaced points to provide four point support, wherein the rigid crossbar is fitted with a plurality of rotatably removable brackets for load carrying is disclosed.

This invention relates to a carrier for attachment to automobiles for carrying luggage, packages and other articles on the automobile.

The object of this invention is to provide a luggage carrier which is light in weight and which may be attached easily to the automobile to form a rigid structure capable of carrying substantial loads.

It is a further object of this invention to provide an article carrier which may be quickly attached to an automobile and easily detached from the automobile and which is capable of carrying heavy loads.

It is a further object of this invention to provide a carrier which is easily attached to an automobile and which is conveniently adapted for carrying four or more bicycles on the automobile.

It is a still further object of this invention to provide a basic automobile luggage carrier which may be adapted for easy and convenient attachment and removal from automobiles having different bumper structures.

Another object of this invention is to provide a carrier which has a principal crossbar load-supporting element and a plurality of easily detachable load-supporting elements carried upon the principal load-supporting element.

It is an additional object of this invention to provide a novel arrangement for connecting and removing the automobile carrier from an automobile and for disassembling the automobile carrier.

Other objects of this invention will become apparent from the drawings and from the following specification.

With reference now to the drawings:

FIGURE 1 shows the carrier of this invention attached to the rear bumper of a Volkswagen automobile such as a model 1200 or 1300 standard sedan or convertible;

FIGURE 2 is a side view of a carrier bracket of this invention showing the principal load bearing crossbar in section taken substantially along 2—2 in the direction of the arrows;

FIGURE 3 is a side view of another load carrying bracket taken on line 3—3 in the direction of the arrows;

FIGURE 4 is a top view of the crossbar load carrying member showing the disassemblable feature thereof taken at line 4—4 in the direction of the arrows;

FIGURE 5 is a detail of the clamp taken at line 5—5 of FIGURE 1 in the direction of the arrows;

FIGURE 6 is a detail of the bumper engaging means taken at line 6—6 in the direction of the arrows;

FIGURE 7 is a detail of the clamping means for securing the end of the brace members to the bumper support of the Volkswagen of FIGURE 1 and is taken at line 7—7 in the direction of the arrows;

FIGURE 8 is a side view of the clamping means of FIGURE 7 and is taken at line 8—8 of FIGURE 7 in the direction of the arrows;

FIGURE 9 is a view of the carrier of this invention attached to the rear of a conventional American automobile;

FIGURE 10 is a top view of the carrier of FIGURE 9 taken at line 10—10 in the direction of the arrows;

FIGURE 11 is a detail of the clamp member arrangement and attachment to the automobile taken at line 11—11 of FIGURE 9 in the direction of the arrows;

FIGURE 12 is a detail of the means used for attaching the brace members to the automobile and is taken at line 12—12 in the direction of the arrows, shown for illustration purposes prior to tightening; and FIGURE 13 is a side view detail of the attaching means of FIGURE 12 taken at line 13—13 of FIGURE 11 in the direction of the arrows.

The invention will now be described in terms of the embodiments disclosed in the drawings; however, it will be understood that the drawings are merely exemplary of the carrier of this invention and are not limiting.

Referring now to FIGURE 1, the rear of an automobile 10 is shown with a part of a bicycle shown at 12 on the carrier 20 of this invention.

The carrier of this invention comprises a crossbar 22 which has a first segment 24 and a second segment 26 which may be rigidly fixed together or easily disassembled as will be described hereinafter.

The carrier is supported above the bumper by upright support members 28 and 30 which in a preferred embodiment may comprise steel or aluminum tubing. The lower end of support members 28 and 30 are attached at their lower end by bumper engaging means 32 and 34 to the bumper 36 of the automobile 10. The bumper 36 has bumper guard bars 38 and 40 and in a preferred embodiment the bumper engaging means 32 and 34 coact with the bumper and with the bumper guard bar to firmly affix the support members 28 and 30.

The length of the support members 28 and 30 is adjustable by means of sleeves 42 and 44 and are locked in place by lock nuts 46 and 48. Other suitable adjusting means would be equivalent. Support members 28 and 30 furnish two points of support for the crossbar 22. Two additional supports for the crossbar 22 are provided by brace members 50 and 52 which are attached to the car at a point remote from the bumper and in a non-linear arrangement therewith to provide four nonlinearly spaced supports for the crossbar 22. In a preferred embodiment, the brace members 50 and 52 are attached to bumper supports 60 and 62 of the Volkswagen sedan or convertible. Of course, it will be understood that the nature of the attachment will be adapted to accommodate the particular types of bumpers and bumper supports.

Brace members 50 and 52 are attached to support members 28 and 30 by clamps 54 and 56.

Preferably the carrier of this invention includes four carrying arms or brackets 70, 72, 74 and 76. These brackets, as best shown in FIGURES 2 and 3, are easily attachable to the crossbar and easily removable therefrom but when attached they are capable of carrying heavy loads.

With reference now to FIGURE 2, the crossbar includes a top surface 80 and sides 82 and 84 extending downwardly therefrom, in a preferred embodiment, at approximately right angles to the surface 80. The bracket 72 includes an engagement member 88 which has a top 90 which is substantially coextensive with the top surface 80 of crossbar 22 and downwardly extending sides 92 and 94 which may be coextensive with sides 82 and 84, but in a preferred embodiment, side 92 extends downwardly beyond the side 82. Side 94 has attached to the bottom hereof a hook 96 which extends only a portion of the way under the bottom surface of crossbar 22. It will be seen that the bracket member 88 may easily be lifted off or removed from the crossbar 22 simply by moving it about the crossbar 22 in a clockwise direction, as viewed in FIGURE 2. Motion in the counterclockwise direction is prevented by hook 96. A load carrying member 100 is fixedly secured to the bracket 88 and includes an upright member 102 and horizontal member 104 with an upward projection 106 and an upturned end 108. A plurality of bicycles 12 may be carried thereon. Four to seven such bicycles may be so carried. Other articles, such as luggage or power lawn mowers may also be carried by appropriate load carrying members.

Another type of load carrier is shown in FIGURE 3. Bracket 76 includes an engagement member having a top 110, sides 112 and 114 and a hook 116, as well as a carrier member 118 secured to the top 110. This carrier may be removed in the manner described with reference to carrier 72 of FIGURE 2.

In order to facilitate storage and handling of the carrier of this invention during periods of nonuse, the crossbar 22 is provided with a joint which is easily assembled and easily disassembled. The disassemblable joint is shown in FIGURE 4. The crossbar includes segments 24 and 26, segment 26 having a slot 120 intersecting the joint end thereof and an aperture 122 therein. A bolt 124 having a nut 126 thereon extends through slot 120 and a pin 128 extends through aperture 122 from a plate 130 which is fixedly secured to the first segment 24. The plate 130 is in overlapping relationship with the second segment 26.

A detail of clamp 54 for attaching the brace members to the support members is shown in FIGURE 5. The clamp comprises a U-shaped clamp member 132 surrounding the support member 28 and a U-shaped clamp member 134 surrounding the brace 50. The clamp members 132 and 134 are securely fixed together by bolt 136 and nut 138.

FIGURE 6 shows the lower end of support member 30 which is curved at its lower end to coact with the bumper 36 and bumper guard 40 of FIGURE 1. The lower end has an extension 140 which engages one side of the bumper 36 and a projection 142 extending generally downwardly from a point approximate to the lower end of the support member for engagement with the other side of the bumper.

In a preferred embodiment, the brace 50 may be secured to the automobile by securing means 150 shown in FIGURES 7 and 8. Securing means 150 includes an arcuate weight support 152 which rests upon the top of bumper support 60. An upward projection 154 is pivotally connected by bolt 156 to brace 50. A hinge 158 connects the weight support member 152 with an arrangement securing under clamp 160 which carries a hook 162 on it. The hook 162 is secured by retainer 164 which is pivotally attached to handle 166. Handle 166 is pivotally attached at 168 to the body of the locking clamp which has projecting ears 170 including therein passages 172 adapted to receive a padlock for locking the securing means on the automobile to prevent theft of the carrier.

FIGURE 9 shows the carrier attached to an American automobile. It is, of course, necessary to adapt the particular securing features of the carrier to the automobile to which it is desired to attach the carrier.

The carrier shown in FIGURE 9 is the same in all essential respects as the carrier shown in FIGURE 1 but the means for securing it to the automobile are adapted to the particular constructional features of the automobile involved.

The lower ends of supports 28 and 30 are bifurcated at 180 and 182 and are received on bolts 184 and 186 which are carried in bracket clamps 190 and 192. The bracket clamps 190 and 192 are secured by bolts 194, 196, 198 and 200 to bumper 202. This figure is, of course, merely indicative of the type of adaptation which may be desirable.

In order to complete the support for the carrier, brace members 50 and 52 are attached to the edge of the trunk compartment in the automobile 176. The means for attaching the ends of the braces is shown in FIGURE 11. A detail of the attaching means is shown in FIGURE 12 where 214 is an upwardly extending portion having a bolt 216 extending therethrough which has a nut 218 thereon. The end of the brace member 50 is secured by tightening nut 218 on bolt 216. The securing means includes a horizontal portion 220, a downwardly extending portion therefrom 222 and a bottom portion 224. Four bolts 226, 228, 230 and the bolt 231 shown only in FIGURE 11 are threadably received in the bottom plate 224. These bolts engage a floating plate 232 which is secured to the bottom plate 224 by a floating pin 234. Of course, it will be realized that any convenient means for attaching plate 224 may be used. In practice, the bolts 226, 228, 230 and 231, all of which engage plate 224, are used to tighten the securing clamp rigidly on the edge of the trunk compartment compressing the weather strip 244. This permits the trunk lid 242 to rest in its usual position with respect to the body 240. A small strip of weather stripping 244 may be added to prevent leakage adjacent the clamp. It will, of course, be realized that the particular structural details of the clamping means may be adapted to any particular configuration of trunk compartment edge and weather stripping or gutter.

While this invention has been described with particular reference to carrying bicycles, it will be realized that it is equally useful for carrying many heavy or awkward articles which may not conveniently be carried inside an automobile. For example, the carrier of this invention is particularly useful for carrying dirty pieces of equipment such as power lawn mowers. It may also conveniently be used for carrying such things as shrubs and heavy articles of luggage or boxes. As shown in FIGURE 9, a board 256 may be placed across brace members 50 and 52 to supply additional carrying space.

The shape of the particular carrying elements shown in FIGURES 2, 3 and 10 may, of course, be varied to accommodate any desired load or article.

It will thus be seen that a carrier has been provided which is easily attached to an automobile, in fact may be attached in as few as sixty seconds by a skilled operator, to provide a rigid four point supported load-carrying crossbar and load-carrying members. The carrier may be removed from the automobile with equal facility and ease. The advantages of a carrier which is capable of carrying heavy loads, for example up to three or four hundred pounds, and which may be attached to the car in a matter of seconds and which may be similarly detached from the automobile in a few seconds, is apparent.

The foregoing is intended to be illustrative of the inventive concept and of the invention herein and does not limit the invention to the particular exemplary structures described. The invention is limited only as defined in the following claims.

We claim:
1. A lightweight detachable four-point supported automobile luggage and article carrier comprising
    a rigid crossbar having a top surface and sides extending downwardly therefrom extending in a direction substantially parallel to the automobile bumper,
    first and second support members rigidly fixed at their upper ends to the crossbar in proximity to first and second ends thereof respectively,
    means on the lower end of the support members for detachable engagement with the bumper,
    first and second brace members,
    means securing the brace members at one end to the first and second support members,
    means for easily securing the other end of the brace members rigidly to the automobile at points distant from the bumper to provide for support of the crossbar at four nonlinearly spaced points, and a bracket supported by and in easily removable engagement with the crossbar, said bracket comprising an engagement member including means substantially coextensive with the top surface of the crossbar, sides extending downwardly therefrom and a hook element extending from the bottom of a first side under only a portion of the bottom of the crossbar to prevent motion of the engagement member about the crossbar in a first direction for load carrying, movement about the crossbar in the second direction being permitted for easy removal of the engagement member from the crossbar, and a carrier member secured to the engagement member for supporting a load.

2. The carrier of claim 1 wherein the crossbar comprises two segments and further including joining means for quickly and easily joining the two segments of the crossbar to form a rigid easily disassemblable crossbar joint.

3. The carrier of claim 2 wherein the joining means includes a plate fixedly secured at one end to a first segment of the crossbar and extending in overlapping relation with the second segment of the crossbar, the second segment of the crossbar having a slot intersecting the joint end thereof and an aperture therein, a bolt fixedly secured to the plate extending through the slot, means on the bolt securing the plate and the second segment rigidly together, and a pin on the plate received by the aperture in the second segment.

4. The carrier of claim 1 wherein the means for engagement with the bumper comprises an extension of the support member for engagement on one side of the bumper and a projection extending generally downwardly from a point proximate the lower end of the support member for engagement on the other side of the bumper.

5. The carrier of claim 4 wherein the means for securing the brace members to the automobile comprises weight support means for resting enagement upon the top of accessible bumper support bars on the automobile, means pivotally connecting the bottom of the brace members to the top of the weight support means, means hingably secured to the weight support means for securing engagement under and around the bumper support bars, and means for locking the brace securing member rigidly on the bumper support bars.

6. The carrier of claim 3 wherein the means for engagement with the bumper comprises an extension of the support member for engagement on one side of the bumper and a projection extending generally downwardly from a point proximate the lower end of the support member for engagement on the other side of the bumper.

7. The carrier of claim 6 wherein the means for securing the brace members to the automobile comprises weight support means for resting engagement upon the top of accessible bumper support bars on the automobile, means pivotally connecting the bottom of the brace members to the top of the weight support means, means hingably secured to the weight support means for securing engagement under and around the bumper support bars, and means for locking the brace securing member rigidly on the bumper support bars.

8. A lightweight detachable four-point supported automobile luggage and article carrier comprising a rigid segmented crossbar extending in a direction substantially parallel to the automobile bumper, first and second support members rigidly fixed at their upper ends to the crossbar in proximity to first and second ends thereof respectively, means on the lower end of the support members for detachable engagement with the bumper, first and second brace members, means securing the brace members at one end to the first and second support members, means for easily securing the other end of the brace members rigidly to the automobile at points distant from the bumper to provide for support of the crossbar at four nonlinearly spaced points, a plate fixedly secured at one end to a first segment of the crossbar and extending in overlapping relation with the second segment of the crossbar, the second segment of the crossbar having a slot intersecting the joint end thereof and an aperture therein, a bolt fixedly secured to the plate extending through the slot, means on the bolt securing the plate and the second segment rigidly together, and a pin on the plate received by the aperture in the second segment.

9. The carrier of claim 8 wherein the means for engagement with the bumper comprises an extension of the support member for engagement on one side of the bumper and a projection extending generally downwardly from a point proximate the lower end of the support member for engagement on the other side of the bumper.

10. The carrier of claim 8 wherein the means for securing the brace members to the automobile comprises weight support means for resting engagement upon the top of accessible bumper support bars on the automobile, means pivotally connecting the bottom of the brace members to the top of the weight support means, means hingably secured to the weight support means for securing engagement under and around the bumper support bars, and means for locking the brace securing member rigidly on the bumper support bars.

11. The carrier of claim 10 wherein the means for engagement with the bumper comprises an extension of the support member for engagement on one side of the bumper and a projection extending generally downwardly from a point proximate the lower end of the support member for engagement on the other side of the bumper.

References Cited

UNITED STATES PATENTS

| 2,464,979 | 3/1949 | Hyatt | 224—42.03 |
| 2,779,524 | 1/1957 | Carlson | 224—42.08 |
| 2,783,367 | 2/1957 | Locke. | |
| 3,139,203 | 6/1964 | Borger | 214—450 |

FOREIGN PATENTS

| 688,374 | 6/1964 | Canada. |
| 93,243 | 11/1938 | Sweden. |
| 288,052 | 5/1953 | Switzerland. |
| 342,096 | 12/1959 | Switzerland. |

GERALD M. FORLENZA, *Primary Examiner.*

F. E. WERNER, *Assistant Examiner.*